Aug. 13, 1929. W. HERTZ Re. 17,404

BATHING DRESS

Original Filed March 10, 1923

INVENTOR

Walter Hertz

BY

Jacob Huberman his ATTORNEY

Reissued Aug. 13, 1929. Re. 17,404

UNITED STATES PATENT OFFICE.

WALTER HERTZ, OF COLOGNE-ON-THE-RHINE, GERMANY.

BATHING DRESS.

Original No. 1,489,124, dated April 1, 1924, Serial No. 624,173, filed March 10, 1923. Application for reissue filed December 19, 1924. Serial No. 757,074.

The present invention relates to a bathing dress or bathing suit, and more particularly to one provided with a bust supporter.

Bathing suits, as ordinarily made, make no provisions for supporting the bust of the wearer. Where such support is desired it has generally been necessary to provide a separate garment in the form of a brassière to be put on inside the bathing suit. This is an inconvenient arrangement. The brassière may work out of place on the wearer, or it may be lost or accidentally mislaid, or unavailable when wanted.

According to the present invention, however, the bathing suit is provided with a bust supporter which is attached to the body of the suit and forms a part of the suit. In this way, the wearer has a unitary, combined garment, which may be put on or taken off without difficulty. The parts of the garment are fitted to the wearer and stay in place. There is no possibility of separation or loss. The bathing suit made according to the present invention is much less expensive than the separate garments for the same purposes. It may be laundered and dried in the same manner as the ordinary bathing suit.

The present invention contemplates a bathing suit in which a bust supporter, preferably made in two parts and buttoned together in the front, is attached to the body of the suit below the armholes, and in which a band, preferably made of knitted or elastic material, is, if desired, also attached to the body of the suit underneath the armholes. It also contemplates the holding up of the bust supporter by means of straps passed over the shoulders of the wearer preferably independent of the shoulder straps or shoulder portion of the body of the bathing suit. In this manner the operation and adjustment of the bust supporter is made independent of the operation and adjustment of the bathing suit. It also contemplates having the front of the suit so arranged that the bust supporter may be concealed when the suit is in use.

In the accompanying drawings there is shown one of the many possible embodiments in which the present invention may take form, it being understood that the drawings are merely illustrative of the invention, rather than limiting the same.

Figure 2:
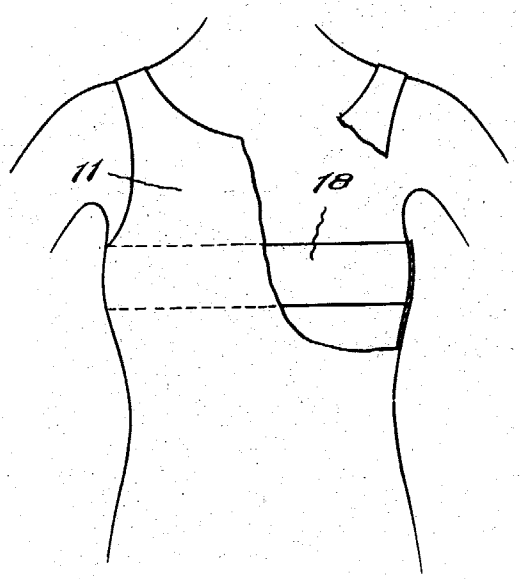
Fig. 2 is a back view showing the suit on the wearer, with parts broken away to show the arrangement of the band which passes about the back of the wearer.

The body of the bathing suit or dress may be made up in any desired manner and of any desired material. It is provided with a front portion 10 which is adapted to extend down toward the waist of the wearer and is adapted to be dropped below the armpits. It also includes a back portion 11 adapted to fit the back of the wearer and to extend up over the shoulders. The upper part of the back and front portions may be provided with the customary buttons 12 for the purpose of fastening the suit on the wearer, or they may be otherwise fastened together.

The bust supporter above referred to is preferably made in two sides or parts 13, 13, the outer ends of which are attached to, or otherwise connected with, the body of the garment below the armholes. The sides of the bust supporter may be detachably connected by buttons 14, or in other suitable manner. The material from which the bust supporter is made is preferably cut in such a manner that the parts are considerably wider toward the front than where they are attached to the body of the garment, so that they may extend well around the bust of the wearer. They are preferably held in place on the wearer by means of straps 15, passed over the shoulders and attached to the back portion of the garment. In order that the bust supporter may be readily adjustable the straps 15 are preferably provided with a number of buttonholes 16 cooperating with buttons 17 on the upper edge of the bust supporter parts.

In order to overcome any tendency of the bust supporter to creep in a forward or upward direction a band 18 is secured at its ends to the body of the garment underneath the armholes. This band is preferably made of elastic or knitted material such as hosiery.

Figure 1:
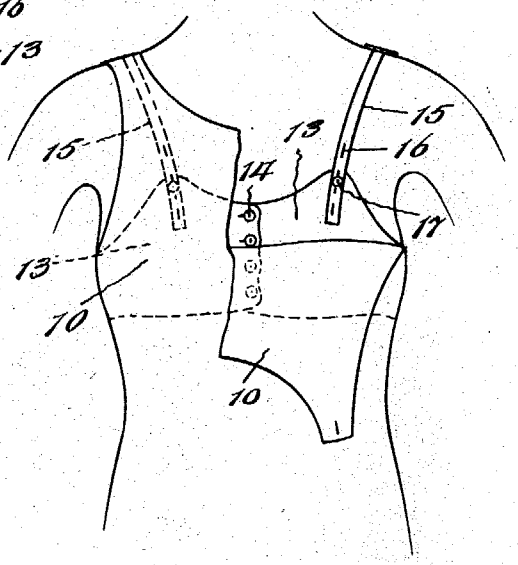
Fig. 1 is a front view showing the present bathing dress or bathing suit on the wearer, with a part of the suit broken away to show the interior construction of the bust supporter.
Figure 3:
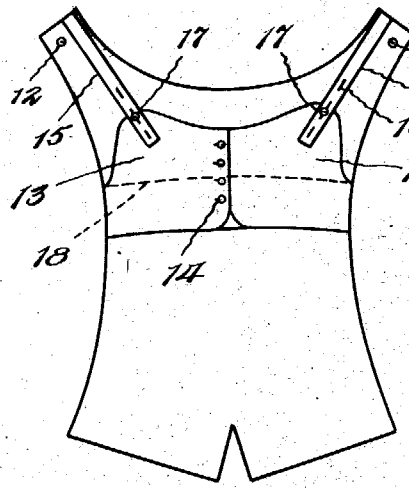
Fig. 3 is a front view of the suit, the upper front portion being omitted.
Figure 4:
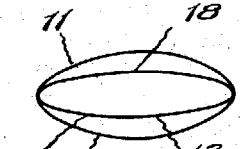
Fig. 4 is a diagrammatic transverse view showing the position of the bust supporter and band within the top of the garment.

The suit which has been described may be readily put on by the wearer. In preparing the suit to put it on one would unbutton the front portion of the suit dropping it down as indicated in the right side of Fig. 1, and would also unbutton the shoulder straps from the bust supporter, and the front of the bust supporter. The suit would then be drawn on in the usual manner, the strap 18 being allowed to come up alongside the back of the wearer. The bust supporter parts would then be buttoned together and the shoulder straps adjusted, then the drop front portion would be buttoned up over the shoulder, as indicated at the left of Fig. 1. The garment is then in position on the wearer. The bust will be comfortably supported inside the body of the bathing suit, thereby increasing the comfort of the wearer and improving the appearance.

It is obvious that the invention may be embodied in many forms and constructions and I wish it to be understood that the particular form shown and described is but one of the many forms. Various modifications and changes being possible, I do not in any way limit myself with respect thereto.

I claim:

1. A bathing suit having a drop front portion above the waist, a back portion, means adapted to pass over the shoulders of the wearer for interconnecting the upper parts of the front portion and the back portion, thereby supporting the suit on the wearer and providing armholes, a bust supporter free of the front portion of the suit and whose outer ends are attached to the suit below the armholes, and shoulder straps connected with the back portion of the suit and the bust supporter, the front portion of the suit when raised covering and concealing the bust supporter and straps.

2. A bathing suit having a drop front portion above the waist, a back portion, means adapted to pass over the shoulders of the wearer for interconnecting the upper parts of the front portion and the back portion, thereby supporting the suit on the wearer and providing armholes, an interiorly disposed band extending across the back of the suit, a bust supporter free of the front portion of the suit and whose outer ends are attached to the suit below the armholes, and shoulder straps connected with the back portion of the suit and the bust supporter, said band acting to prevent forward and upward movement of the bust supporter on the wearer, the front portion of the suit when raised covering and concealing the bust supporter and straps.

3. A bathing suit having a drop front portion above the waist, a back portion, means adapted to pass over the shoulders of the wearer for interconnecting the upper parts of the front portion and the back portion, thereby supporting the suit on the wearer and providing armholes, an interiorly disposed band extending across the back of the suit, the band being free of said back portion and attached at its ends to the suit below the armholes, a bust supporter free of the front portion of the suit and whose outer ends are attached to the suit below the armholes, shoulder straps connected with the back portion of the suit, and the bust supporter, said band acting to prevent forward and upward movement of the bust supporter on the wearer, the front portion of the suit when raised covering and concealing the bust supporter and straps.

4. A bathing suit having a drop front portion above the waist, a back portion, means adapted to pass over the shoulders of the wearer for interconnecting the upper parts of the front portion and the back portion, thereby supporting the suit on the wearer and providing armholes, an interiorly disposed band extending across the back of the suit, the band being free of said back portion and attached at its ends to the suit below the armholes, a two-part bust supporter free of the front portion of the suit and whose outer ends are attached to the suit below the armholes, means for detachably fastening the inner ends of the bust supporter parts together, shoulder straps connected with the back portion of the suit and the bust supporter parts, said band acting to prevent forward and upward movement of the bust supporter on the wearer, the front portion of the suit when raised covering and concealing the bust supporter and straps.

5. A bathing suit having a drop front portion above the waist, a back portion, means adapted to pass over the shoulders of the wearer for interconnecting the upper parts of the front portion and the back portion, thereby supporting the suit on the wearer and providing armholes, an interiorly disposed band extending across the back of the suit, a bust supporter free of the front portion of the suit and whose outer ends are attached to the suit below the arm holes, shoulder straps connected with the back portion of the suit, and detachable connections between the shoulder straps and the bust supporter, said band acting to prevent forward and upward movement of the bust supporter on the wearer, the front portion of the suit when raised covering and concealing the bust supporter and straps.

6. A bathing suit having a drop front portion above the waist, a back portion, means adapted to pass over the shoulders of the wearer for interconnecting the upper parts of the front portion and the back portion, thereby supporting the suit on the wearer and providing armholes, an interiorly disposed band extending across the back of the suit, a two-part bust supporter free of the front portion of the suit and whose outer ends are attached to the suit below the armholes, means for detachably fastening the inner ends of the bust supporter parts together, shoulder straps connected with the back portion of the suit, and detachable connections between the shoulder straps and the bust supporter parts, said band acting to prevent forward and upward movement of the bust supporter on the wearer, the front portion of the suit when raised covering and concealing the bust supporter and straps.

7. A bathing suit having a drop front portion above the waist, a back portion, means adapted to pass over the shoulders of the wearer for interconnecting the upper parts of the front portion and the back portion, thereby supporting the suit on the wearer and providing armholes, a two-part bust supporter free of the front portion of the suit and whose outer ends are attached to the suit below the armholes, means for detachably fastening the inner ends of the bust supporter parts together, and shoulder straps connected with the back portion of the suit and the bust supporter parts, the front portion of the suit when raised covering and concealing the bust supporter and straps.

8. A bathing suit having a drop front portion above the waist, a back portion, means adapted to pass over the shoulders of the wearer for interconnecting the upper parts of the front portion and the back portion, thereby supporting the suit on the wearer and providing armholes, a two-part bust supporter free of the front portion of the suit and whose outer ends are attached to the suit below the armholes, means for detachably fastening the inner ends of the bust supporter parts together, shoulder straps connected with the back portion of the suit, and detachable connections between the shoulder straps and the bust supporter parts, the front portion of the suit when raised covering and concealing the bust supporter and straps.

9. A bathing suit having a drop front portion above the waist, a back portion, means adapted to pass over the shoulders of the wearer for interconnecting the upper parts of the front portion and the back portion, thereby supporting the suit on the wearer and providing armholes, an interiorly disposed elastic band extending across the back of the suit, the band being free of said back portion and attached at its ends to the suit below the armholes, a two-part bust supporter free of the front portion of the suit and whose outer ends are attached to the suit below the armholes, means for detachably fastening the inner ends of the bust supporter parts together, shoulder straps connected with the back portion of the suit, and detachable connections between the shoulder straps and the bust supporter parts, said band acting to prevent forward and upward movement of the bust supporter on the wearer, the front portion of the suit when raised covering and concealing the bust supporter and straps.

Signed at Cologne, Germany, this 3rd day of December, 1924.

WALTER HERTZ.